(12) United States Patent
Daume et al.

(10) Patent No.: US 7,198,300 B2
(45) Date of Patent: Apr. 3, 2007

(54) ACTUATOR FOR AN ADJUSTABLE SEAT BELT D-RING ANCHOR

(75) Inventors: Eric Daume, Raymond, OH (US); Troy Medlar, Raymond, OH (US); Koji Uno, Raymond, OH (US); Hideyuki Tanahashi, Raymond, OH (US); Kenji Betsui, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 309 days.

(21) Appl. No.: 10/836,300

(22) Filed: Apr. 30, 2004

(65) Prior Publication Data

US 2005/0242563 A1 Nov. 3, 2005

(51) Int. Cl.
*B60R 22/20* (2006.01)
*B60R 22/00* (2006.01)

(52) U.S. Cl. .............. 280/801.2; 280/801.1; 280/808; 297/483; 297/468

(58) Field of Classification Search ........... 280/801.2, 280/801.1, 808; 297/483, 486, 468
See application file for complete search history.

(56) References Cited

U.S. PATENT DOCUMENTS

| | | | |
|---|---|---|---|
| 4,456,283 A | 6/1984 | Forkel Michael et al. | |
| 4,560,204 A * | 12/1985 | Zeumer et al. | 297/483 |
| 4,616,878 A * | 10/1986 | Fohl | 297/483 |
| 5,265,908 A | 11/1993 | Verellen et al. | |
| 5,366,243 A * | 11/1994 | Ray et al. | 280/801.2 |
| 5,655,793 A * | 8/1997 | Isonaga | 280/801.2 |
| 5,692,780 A | 12/1997 | Yasui | |
| 5,725,248 A * | 3/1998 | Inoue et al. | 280/801.2 |
| 5,782,491 A * | 7/1998 | Patel | 280/801.2 |
| 5,924,731 A * | 7/1999 | Sayles et al. | 280/807 |
| 6,123,391 A * | 9/2000 | Boelstler et al. | 297/464 |
| 6,186,548 B1 * | 2/2001 | McFalls | 280/801.2 |
| 6,254,133 B1 * | 7/2001 | Schmid | 280/801.1 |
| 6,312,014 B1 | 11/2001 | Ando et al. | |
| 2005/0253366 A1* | 11/2005 | Uno et al. | 280/730.2 |

* cited by examiner

*Primary Examiner*—Paul N. Dickson
*Assistant Examiner*—Joselynn Y. Sliteris
(74) *Attorney, Agent, or Firm*—Rankin, Hill, Porter & Clark LLP

(57) ABSTRACT

An actuator for an adjustable seat belt D-ring anchor is provided that is easily reached by a vehicle operator while in a seated position and that blends in with the interior of the vehicle. The actuator includes a slider garnish that in turn supports a button garnish. Upon pressing the button garnish, a lever on the button garnish actuates a button assembly on a vehicle that in turn releases a locking pin on the anchor, allowing the anchor to be moved.

12 Claims, 7 Drawing Sheets

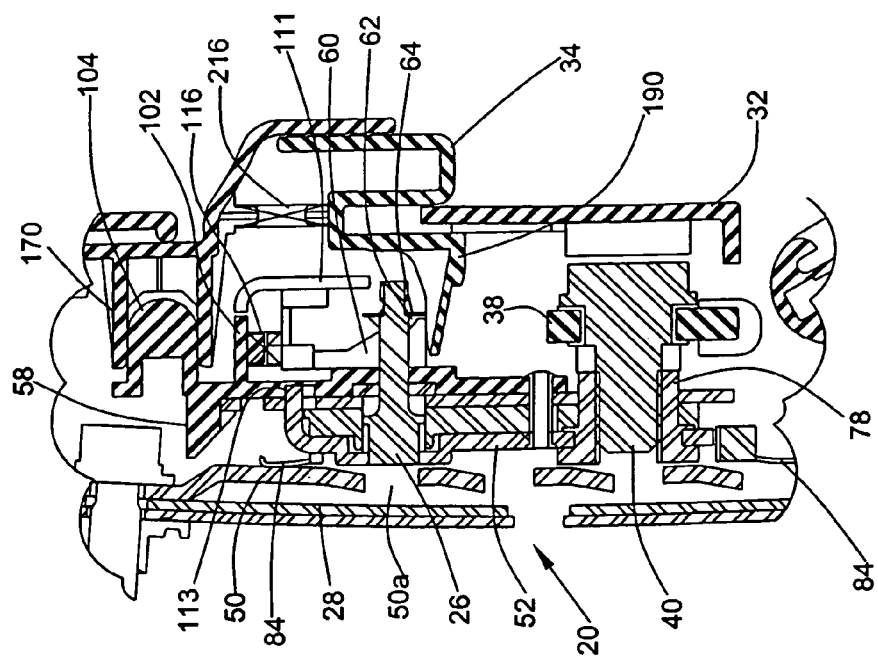
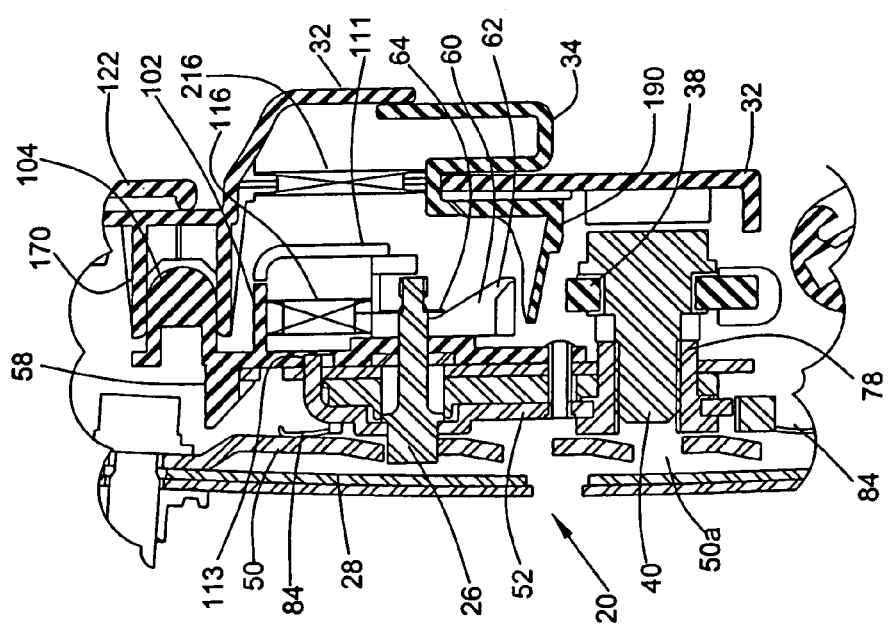
FIG. 4A
FIG. 4B

ACTUATOR FOR AN ADJUSTABLE SEAT BELT D-RING ANCHOR

BACKGROUND OF THE INVENTION

1. Field of the Invention

The present invention relates to vehicle components and more specifically to an actuator for a movable connection component between a vehicle frame and seat belt web.

2. Description of Related Art

Modern vehicle design caters to the comfort and safety of drivers. This is apparent in the design of seat belt systems. Typical modern seat belt systems include a receptacle that receives a buckle, the buckle being slidingly supported on a web that is fixed at one end and that retracts onto and pays out from a spool on an opposite end. For safety and aesthetics, the spool of web material is located near the bottom of the vehicle's B-pillar. In a preferred configuration the web pays out from the spool upward to a D-ring located near the occupant's shoulder, then crosses the occupant's chest to a buckle affixation point, then crosses the occupant's lap to a fixed mounting position. Vehicle occupants, once seated in the vehicle, like to adjust the vertical position of the D-ring, and hence the web position, to suit their body size. The D-ring is supported by an anchor that may slide with respect to the B-pillar to provide this adjustability.

In a common configuration of a belt system, the D-ring extends from the anchor into the passenger compartment of the vehicle and is not covered by any garnish members. Likewise, the portion of the web extending from the spool to the D-ring is uncovered by garnish.

A preferred component for holding the anchor in place in between periods of adjustment is a pin oriented generally perpendicular to the B-pillar. A system utilizing a perpendicular pin is disclosed in U.S. Pat. No. 6,312,014 to Ando et al. The perpendicular pin is preferred because its location within the seat belt system has minimal effect on the design and function of other components. For example a channel within which an anchor is slidingly supported may be formed with a narrow profile, as a result not creating an obstruction within the passenger compartment. Further, the perpendicular pin provides a sturdy connection between the anchor and the B-pillar.

Unfortunately, modern designs using a perpendicular pin do not provide favorable ergonomics for vehicle occupants. Occupants in most instances do not know where to set the D-ring anchor until they are seated within the vehicle. At that time there are a minimum number of positions that the occupant can assume to comfortably reach and adjust the anchor. A preferred position is to reach up from the beneath the D-ring, that is located at or above the occupants shoulder to release the anchor. Accordingly there is a need in the art for a simple movable seat belt anchor system having a superior actuator that may be actuated from beneath, thus, providing easy use for an occupant in a seated position.

Additionally, in areas of the vehicle passenger compartment away from the dashboard, it is aesthetically pleasing to hide or disguise actuators and controls, thus, providing a less "busy" appearance. Accordingly, there is a need in the art for an actuator that blends in with the rest of the vehicle interior in a pleasing manner.

SUMMARY OF THE INVENTION

The present invention provides an improvement over the prior art by providing a garnish and actuator system for an adjustable seat belt D-ring anchor that includes a perpendicular pin and permits ergonomic adjustment of the D-ring anchor. Moreover the present invention provides a system that operates simply, can be constructed easily and does not stand out within the vehicle's interior.

In one aspect of the invention an actuator system is provided that includes a slider garnish and a button garnish supported by the slider garnish. The button garnish includes a touch surface and an actuating lever. As the operator pushes on the touch surface, the button garnish and actuating lever are displaced vertically upward, causing a pin that locks the D-ring anchor in place to move and unlock the D-ring anchor. The anchor may then be adjusted to the desires of the vehicle operator and locked again.

The slider garnish is supported by a pillar garnish that generally covers a portion of a seat belt web extending from a spool to a D-ring in a vehicle.

In another aspect of the invention the actuator system also includes a button assembly that includes the pin that locks the D-ring anchor in place. The button assembly additionally includes a slider supported on a rail affixed to the vehicle's D-pillar as well as a button with a pitched body. The button is moved by the actuating lever on the button garnish and, as it moves, the pitched body cams against a push nut affixed to the pin, thus, causing the pin to retract from an interference position with the rail, allowing the anchor to be moved.

BRIEF DESCRIPTION OF THE DRAWINGS

These and further features of the invention will be apparent with reference to the following description and drawings, wherein:

FIG. 4A is a cross sectional view of the D-ring anchor in a locked configuration;

FIG. 4B is a cross sectional view of the D-ring anchor in an unlocked configuration;

DETAILED DESCRIPTION OF THE PREFERRED EMBODIMENTS

Figures 1A, 1B:
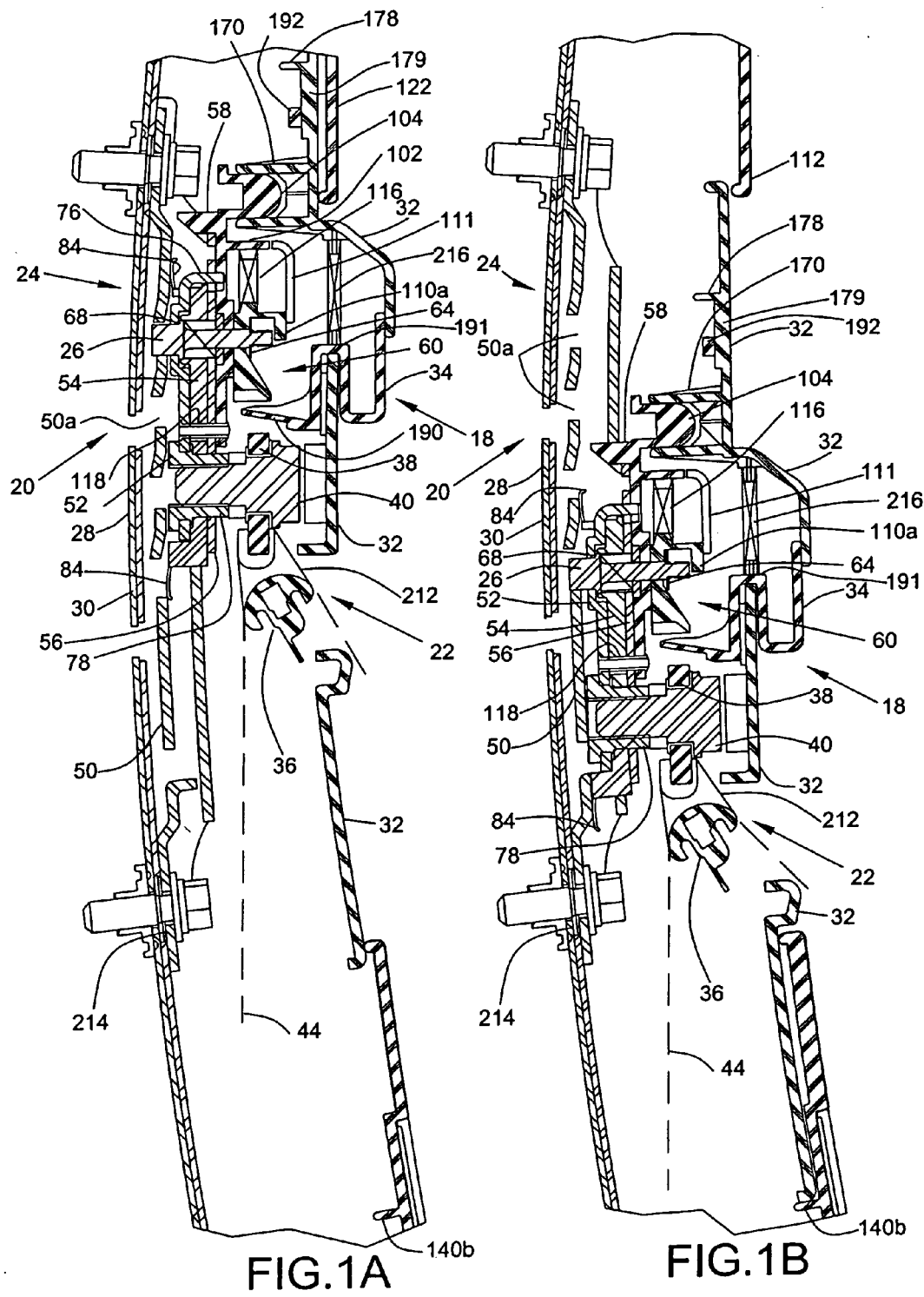
FIG. 1A is a cross sectional view of the B-pillar of a vehicle including an anchor and the actuator of the present invention showing the anchor in a first position.
FIG. 1B is a cross sectional view of the B-pillar of the vehicle including the anchor and the actuator of the present invention showing the anchor in a second position.

Referring to the drawings, a preferred actuator 18 for an adjustable seat belt D-ring anchor 20 according to the present invention is illustrated. As described in more detail below, the D-ring anchor 20 includes a D-ring support assembly 22 and a button assembly 24, which includes a movable pin 26 for selectively affixing the D-ring anchor 20 to the B-pillar 28 of a vehicle 30. The actuator 18 includes a slider garnish 32 and button garnish 34 that actuates the button assembly 24.

Figure 2:
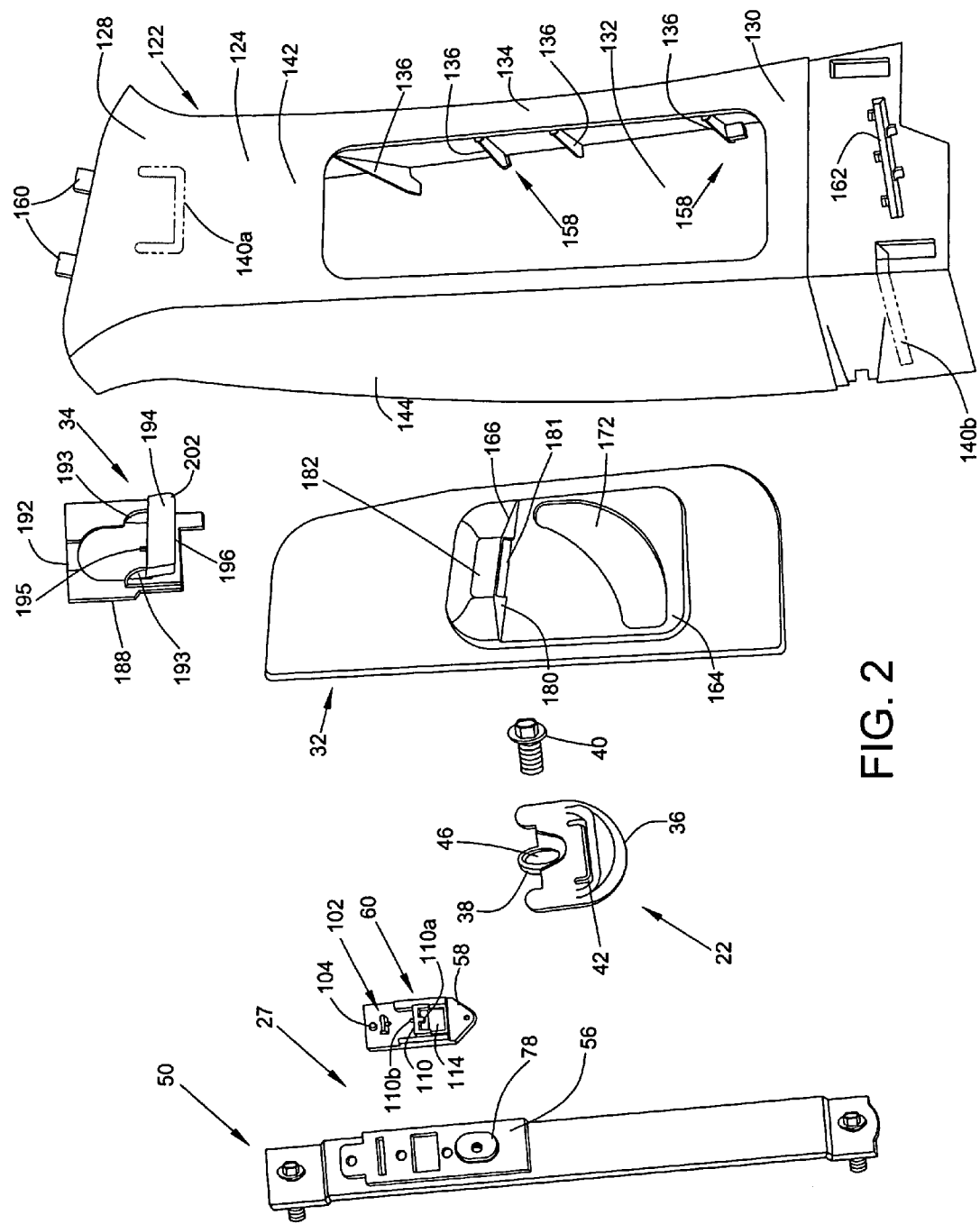
FIG. 2 is an exploded view including the button assembly, rail, D-ring, and garnishes.

Referring to FIGS. 1A–2, the D-ring support assembly 22 of the anchor includes the D-ring 36, a support bearing 38, and a bolt 40 to affix the D-ring support assembly 22 to the button assembly 24. The D-ring 36 is located at a base of the D-ring support assembly 22 and comprises a D-shaped member defining a generally horizontal slot 42 through which a seat belt web 44 passes. The uppermost section of the D-ring 36 defines an aperture 46 that facilitates supporting of the D-ring 36 upon the support bearing 38, which allows the D-ring 36 to pivot in response to adjustments made by the vehicle occupant. The support bearing 38 is supported on a bolt 40 that attaches generally perpendicularly to the button assembly 24.

Figure 3:
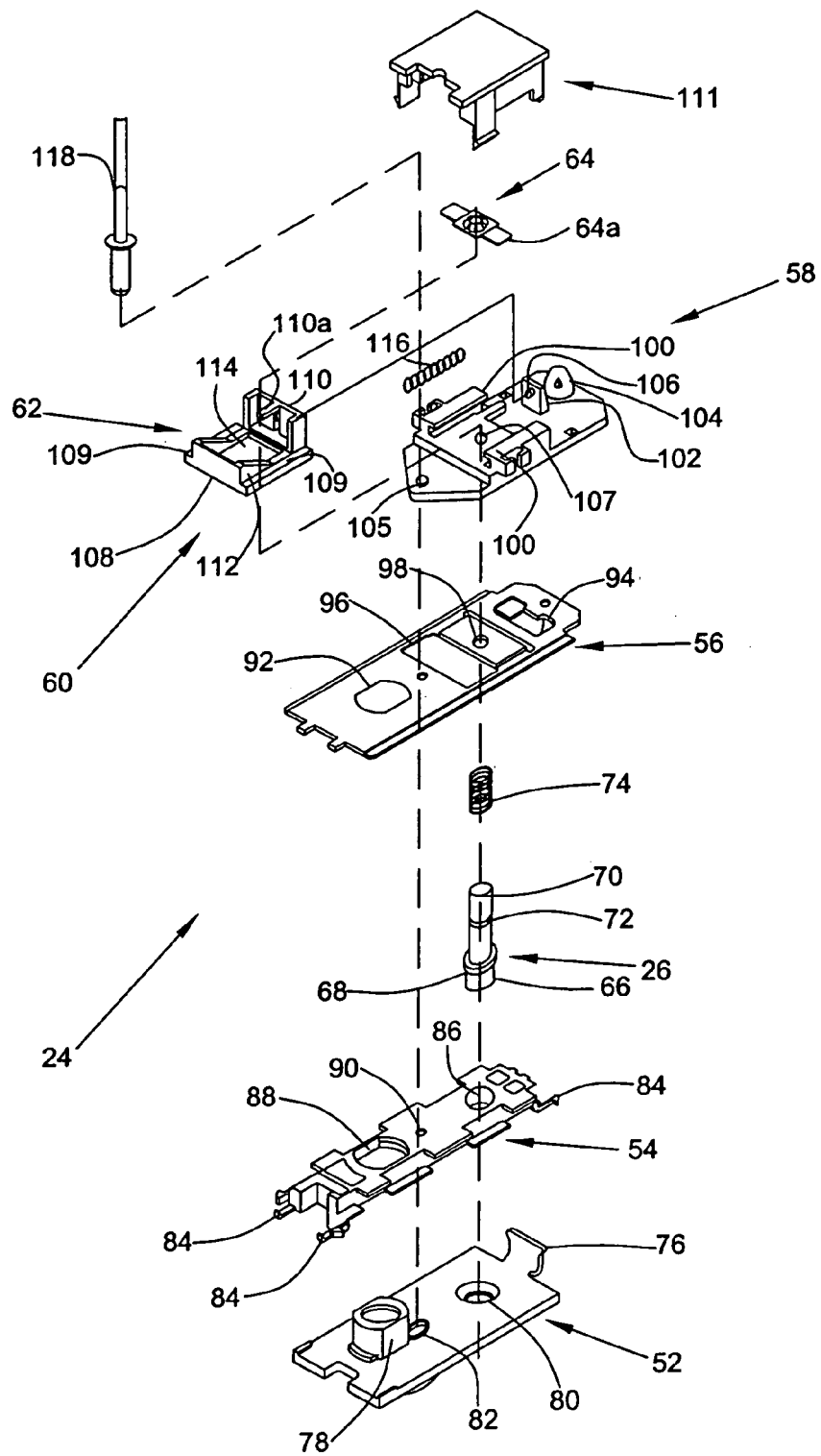
FIG. 3 is an exploded view of a button assembly.

A support assembly 27 (FIG. 2) is affixed to the B-pillar 28 (FIGS. 1A–1B) and permits the D-ring support assembly 22 to be adjustably secured to the B-pillar 28, as will be apparent from the following. With reference to FIGS. 2 and 3, the support assembly 27, which is part of the button assembly 24, described hereinafter, includes a rail 50, a base 52, a slider 54, and a plate 56.

The rail 50 is elongated so as to extend along a portion of the length of the B-pillar 28, and is affixed to the B-pillar via bolts, as illustrated. The rail 50 has a series of slotted openings 50a formed therein (FIG. 1A–1B; FIG. 4A–4B) that are adapted to selectively receive the pin 26, which is part of the button assembly 24 described hereinafter. The base 52, slider 54, and plate 56 are stacked upon each other and the rail 50 so as to provide a structure to which other portions of the button assembly 24 are releasably secured.

The base 52 is a generally rectangular, metal plate that includes a tang 76 at an upper end and an integral, upstanding nut 78 adjacent to a lower end. The nut 78 threadably receives the bolt 40 that secures the D-ring 36 to the support assembly 27 and B-pillar 28. The base 52 also defines one aperture 80 adjacent to the upper end and another aperture 82 generally near the center.

The slider 54 is generally rectangular, formed from metal, and disposed over the base 52. The slider 54 includes extending fingers 84 at each corner that slide over the rail 50 (FIG. 1). The slider 54 defines three apertures: a first aperture 86 adjacent to an upper end, a second aperture 88 adjacent to a lower end, and a third aperture 90 in a generally central location. As will be apparent from the drawings (e.g. FIG. 3) and the following discussion, the second aperture 88 aligns with and receives the integral nut 78 extending from the base 52, the first aperture 86 aligns with the one aperture 80 of the base 52 and receives the pin 26 (described hereinafter), and the third aperture 90 aligns with the other aperture 82 of the base 52 and receives a rivet 118 (described hereinafter) that helps to hold the button assembly 24 together.

The plate 56 is generally rectangular and metal, and is disposed over the slider 54 on a side of the slider 54 opposite to the base 52. The plate 56 defines an aperture 92 adjacent to a lower end, a smaller aperture 94 adjacent an upper end and two generally central apertures 96 and 98 of differing size. As visualized best in FIG. 3, the aperture 92 at the lower end of the plate 56 aligns with the second aperture 88 of the slider 54 and receives the integral nut 78 extending from the base 52. One of the central apertures 96 aligns with the slider's third aperture 90 and the other aperture 82 of the base 52. The other central aperture 98 aligns with the first aperture 86 of the slider 54 and with the aperture 80 at the upper end of the base 52.

Referring to FIGS. 1A and 3, the button assembly 24 includes, in addition to the support assembly 27 described hereinbefore, the pin 26, which is selectively affixable to the B-pillar 28 via the support assembly 27, a button 60 including a pitched body 62, and a push nut 64 affixed to the pin 26.

The pin 26, which is oriented generally perpendicular to a plane defined by the B-pillar 28 and generally perpendicular to an axis defined by the length of the vehicle 30, includes a head section 66 and a tail section 70. The pin's head section 66 is provided at a first end of the pin 26, and has an enlarged base so as to define a flange 68 at an intersection between the head section 66 and the tail section 70. The flange 68 extends radially away from the head section 66 so as to define an enlarged or upstanding rim partway along the length of the pin 26.

The tail section 70 is relatively elongated and integrally formed with the head section 66 of the pin 26, extends from the head section 66 in a direction away from the B-pillar 28, and has a diameter smaller than the diameter of the head section 66. The tail section 70 defines an annular groove 72 adjacent an end of the pin 26 that is adapted to receive the push nut 64 and thereby retain the push nut 64 on the pin 26.

The push nut 64 preferably has a generally circular inner body, a plurality of inwardly extending portions that grip edges of the annular groove 72, as is well known in the art, and a pair of outwardly extending wings 64a, which, in use, cammingly ride over the pitched body 62 of the button 60 as the button 60 is moved vertically, as will be apparent from the following discussion.

A pin return spring 74 is disposed over the tail section 70 of the pin 26 and is trapped between the flange 68 and an inner surface of the plate 56 such that the pin 26 is biased toward an extended position wherein the pin's flange 68 is in engagement with the base 52, as illustrated FIGS. 1A–1B. In this biased or extended position the pin 26 extends out of the base 52 and is in a position to be received within the notched or slotted openings 50a of the rail 50, as illustrated. The push nut 64 and flange 68 maintain the pin 26 in position when the return spring 74 is in the biased condition.

The head section 66 is sized and shaped to extend into and through the aligned apertures 86, 80 in the slider 54 and base 52, while the pin's flange 68 engages the base 52, such that the head section 66 may be inserted into and removed from an aligned hole in the rail 50, as described hereinafter.

The button holder 58, which is generally rectangular and formed from plastic, is positioned over and adjacent the plate 56. The button holder 58 has a body including two upstanding rail-like slides 100, a tab 102, a curved projection 104, a first or mounting aperture 105, a second aperture 107, and a slotted groove 113 (FIGS. 4A–4B) on the side facing toward the B-pillar 28. The slotted groove 113 receives an end of the tang 76 from the base 52, as shown.

The upstanding rail-like slides 100 extend lengthwise along opposite side edges of the body of the button holder 58 and defines inwardly open U-shaped grooves that receive lateral slide surfaces 109 of the button 60, described hereafter. The button holder tab 102 extends out perpendicularly to the plane defined by the button holder 58, and includes a cylindrical boss 106 extending parallel to the plane of the button holder 58 that receives one end of a button return spring 116, described hereinafter. The curved projection 104 extends in a direction similar to the tab 102, and is adapted to be received within a holder 170 provided by an inner surface of a slider garnish 32, described hereinafter.

The rivet 118 extends through the button holder 58 first or mounting aperture 105 while the pin tail section 70 extends through the second aperture 107, thereby securing the button holder 58 to the plate 56 and the remainder of the support assembly.

The button 60 is slidably supported within the rail-like slides 100 of the button holder 58 and includes lateral slide surfaces 109, a contact surface 108 at a lower end, and a barrier 110 at an upper end. The second end of the button return spring 116 is received by a boss 115 (FIG. 2) provided by an upwardly facing surface of the barrier 110. It is noted that the barrier 110 includes an extending tab 110a that, during normal usage, serves as an anti-G-force stopper to keep the pin 26 in a locked condition during an undesired lateral acceleration. As such, the extending tab 110a is disposed at the end of the pin tail section 70, as illustrated in FIGS. 1A–1B. The oppositely-facing surface of the barrier 110 includes a button return spring mount 110b (FIG. 2) that aligns with the boss 106 on the button holder tab 102.

Two spaced walls 112 taper from the top of the contact surface 108 to generally the center of the button 60 along its periphery to form the pitched body 62. The spaced walls 112 cooperate to define a camming surface over which the push nut wings 64a ride to move the pin 26 relative to the rail notches 50a as the button 60 is moved vertically, as described further hereinafter. The button 60 further defines an aperture or opening 114 between the two spaced walls 112 through which the pin tail section 70 extends.

The button return spring 116 is disposed between the barrier 110 of the button 60 and the tab 102 of the button holder 58. The rivet 118 extends through the mounting aperture 105 in the button holder 58, through the center aperture 96 in the plate 56, through the third aperture 90 in the slider 54, through the center aperture 82 in the base 52 and is plastically deformed (e.g., see FIG. 1A) to hold the button assembly components together. Similarly, the pin head section 66 is trapped between the base 52/slider 54 and the undersurface of the plate 56, while the pin tail section 70 extends through the plate aperture 98, through the second aperture 107 in the button holder 58, and upwardly through the opening 114 in the button 60. The push nut 64 is disposed over the tail section 70 and received in the groove 72. The wings 64a of the push nut 64 are in sliding engagement with the angled surface of the spaced walls 112. As will be apparent from the following, vertically sliding the button 60 against the bias of the button return spring 116 causes the pin 26 to retract from the receiving notch 50a in the rail 50 and the hole 80 in the base 52.

A cover 111 is pushed on over the button holder 58 so as to substantially cover a portion of the button 60. The cover 111 includes bayonet-type or snap-fit legs and pins that are received within corresponding receptacles in the button holder 58.

Figure 5:
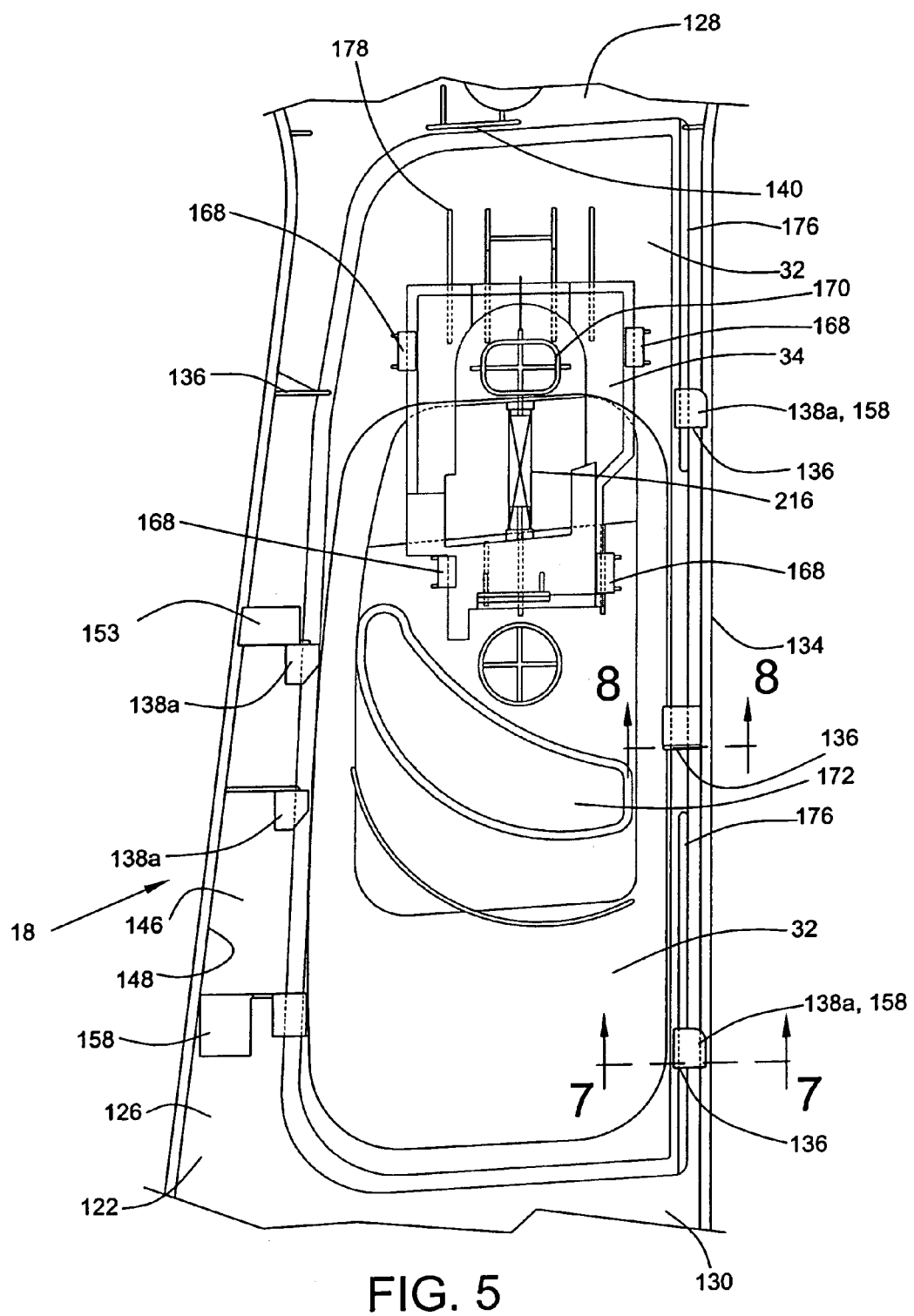
FIG. 5 is an assembled rear elevational view of the button, slider and pillar garnishes.
Figure 6:
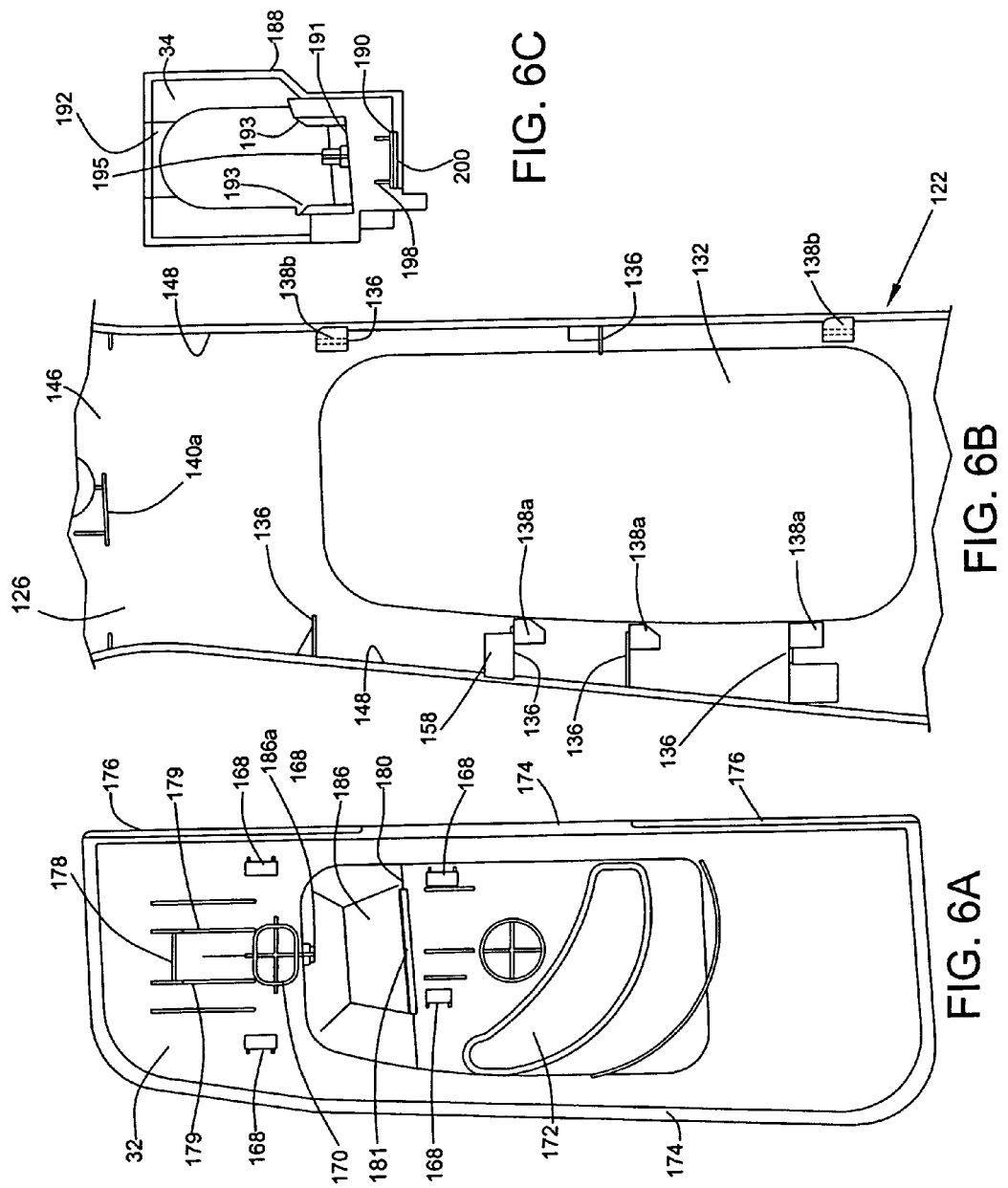
FIG. 6A is a rear elevational view of the slider garnish.
FIG. 6B is a rear elevational view of the pillar garnish.
FIG. 6C is a rear elevational view of the button garnish.

Referring to FIGS. 2, 5 and 6B, a pillar garnish 122 together with the actuator system 18, which includes a slider garnish 32 and button garnish 34, is illustrated.

The pillar garnish 122 is generally channel-shaped and defines an outer surface 124, an inner surface 126, an upper section 128, a lower section 130, and a hole 132 located in a middle section 134 between the upper and lower sections 128 and 130. The hole 132 permits a portion of the slider garnish 32 and button garnish 34 to be accessible or project through the pillar garnish 122, as will be discussed further hereinafter.

The pillar garnish outer surface 124 includes a front surface 142 and two side surfaces 144 that together define the channel shape of the pillar garnish 122. The front surface 142 has a curved contour moving slightly toward the B-pillar 28 near the middle section 134 and away at both the upper and lower sections 128 and 130. The side surfaces 144 follow the arcuate shape defined by the face surface 142. The width of the pillar garnish 122 may increase as the pillar garnish 122 extends downwardly.

The pillar garnish inner surface 126 includes a series of reinforcing ribs 136, clips 138a, 138b, and stops 140a, 140b whose purposes will be described hereinafter. The inner surface 126 includes a rear surface 146 and two side surfaces 148. The clips 138a, 138b, which are integrally molded and protrude from the rear surface 146 and the side surfaces 148, are disposed around the perimeter of the rectangular hole 132 on vertical sides only. The ribs 136 may slightly narrow adjacent the hole 132 so as to avoid interfering with the remainder of the structure, such as portions of the slider garnish 32.

Figures 7, 8:
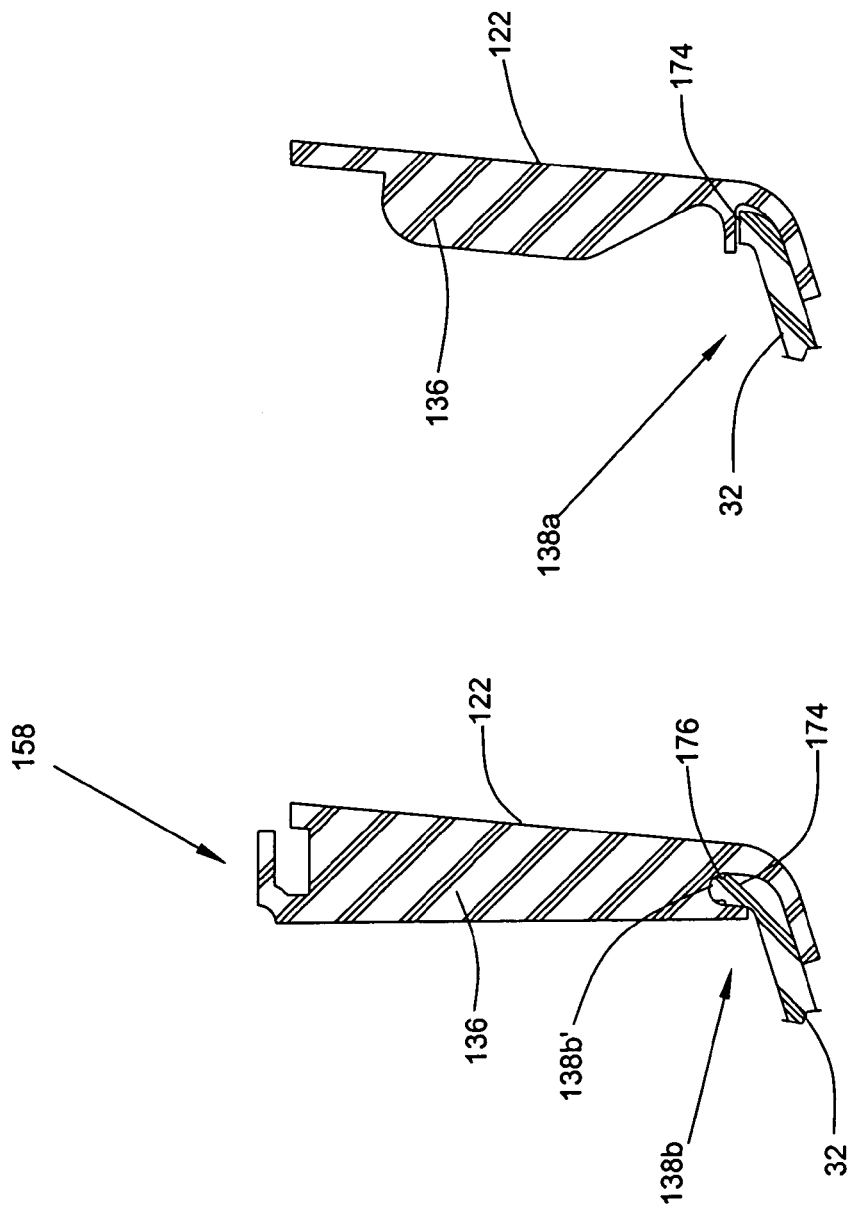
FIG. 7 is a cross sectional view as seen along line 7—7 of FIG. 5.
FIG. 8 is a cross sectional view as seen along line 8—8 of FIG. 5.

Some of the clips 138a (i.e., FIG. 7) are L-shaped in cross-section so as to collectively define a downwardly and inwardly (i.e., toward the hole 132) channel that retains the slide garnish 32 therebeneath. Others of the clips 138b (i.e., FIG. 8) define a downwardly facing groove 138b'. Pairs of these clips 138b cooperate to receive and slidably guide ribs or slider surfaces 176 projecting from a peripheral edge of the slide garnish 32, described hereinafter.

Elongated horizontal upper and lower stops 140a, 140b that restrict vertical movement of the slider garnish 32 protrude from the inner surface 126. The upper stop 140a is centrally located whereas the lower stop 140b is offset laterally, as illustrated. Reinforcing ribs 136 are integrally formed with the interior side surfaces 148 and extend perpendicularly from the rear surface 146. Some of the ribs 136 include clips (138a, 138b) at the lower ends and have flanged upper ends 158 substantially flush with the edge of the side surfaces 148 and opposite the interior surface 126 (see FIG. 7). The flanged ends 158 have laterally outwardly opening slots to permit the pillar garnish 122 to be snapped onto a supporting structure, such as the B-pillar 28.

At the top of the inner surface 126 two brackets 160 are integrally formed with the pillar garnish 122. The brackets 160 extend beyond the periphery of the pillar garnish 122 exterior surface and facilitate securement of the pillar garnish 122 to a vertically adjacent garnish member (not shown). A horizontal metal bar 162 extends partially across the inner surface 126 near the base of the pillar garnish 122. A decorative fabric material may be affixed to some or all of the exterior surface 124 of the pillar garnish 122.

Referring to FIGS. 2, 5 and 6A, adjacent to the pillar garnish 122, towards the B-pillar 28, the slider garnish 32 includes a raised portion 164 including a projecting shoulder 166, clips 168, and the hollow post 170. More specifically, the outer surface of the slider garnish 32 includes the raised portion 164 generally at its middle section that extends away from the B-pillar 28. The raised portion 164 is generally rectangular and includes an additional projecting shoulder 166 at its upper end. The slider garnish raised portion 164, together with the shoulder 166, is adapted to be received in, and extend through, the pillar garnish hole 132, and defines an arcuate aperture 172 through which the seat belt web 44 projects.

The slider garnish 32 has a generally rectangular shape with a surface area that is greater than the area of the hole 132 defined by the pillar garnish 122 such that the pillar garnish hole 132 is continuously covered by the slider garnish 32 regardless of the position of the slider garnish 32. A peripheral wall or rim 174 extends rearwardly from the slider garnish 32 toward the B-pillar 28. One side of the wall 174 includes a pair of enlarged ribs or slide surfaces 176. The ribs or slide surfaces are slidably received within the downwardly extending groove 138b' provided by the spaced-apart clips 138b of the pillar garnish 122.

A stop 178 and a pair of slide rails 179 are disposed in the center of the slider garnish 32 rear surface and adjacent the top of the slider garnish 32, as illustrated. The stop 178 has a narrow height and an extended width and depth. The slide rails 179 slidably receive a slide-like notch 192 provided by the button garnish 34, described hereinafter, and serve to guide the button garnish 34 as it moves vertically over the slider garnish 32.

The generally arcuate shaped aperture 172 is defined by the slider garnish 32 adjacent a lower end within the raised portion 164. The projecting shoulder 166 is generally rectangular, oriented horizontally and includes a surface at its base 180 that is generally perpendicular to the B-pillar and a surface at its top that is contoured 182. The base perpendicular surface 180 defines a generally rectangular aperture 181 through which the button garnish 34 extends. The projecting shoulder 166 of the slider garnish 32 creates a corresponding hollow area or recess 186 on the opposite side of the slider garnish 32 that receives a portion of the button garnish 34. An upper mount 186a for a button garnish return spring 216 extends downwardly into the recess 186, as illustrated.

The hollow post 170 is disposed between the stop 178 and the recess 186, and is positioned to receive the curved projection 104 of the button holder 58. The clips 168 are preferably bayonet-type or snap-fit clips provided to laterally receive the button garnish 34 and slidably guide the button garnish 34 as it moves vertically between a lower, inactive position and an upper or activated position.

Referring to FIGS. 2, 5 and 6C, the button garnish 34 is located on the side of the slider garnish 32 towards the B-pillar 28 and has a frame-like shape. The button garnish 34 includes perimeter walls 188, a lever 190, the slide-like notch 192, and a button member 194 including a touch surface 196. The button member 194 is defined by an upwardly open cup-like structure that is held forwardly of the perimeter frame walls 188 by a generally horizontal spacer wall 191 (FIG. 1A) and a pair of lateral stiffener walls 193. A lower mount 195 for the button garnish return spring 216 extends upwardly from the spacer wall 191.

The button garnish frame is open at its center to receive the post 170 from the slider garnish 32. At the base of the button garnish 34, the lever 190 projects towards the B-pillar 28 and includes two vertical side walls 198 that taper from the button garnish 34 toward the B-pillar 28. A base wall 200 of the lever 190 is integrally formed with and between the two side walls 198. The button member 194 is spaced apart from the frame shaped section away from the B-pillar 28 so as to extend into the shoulder 166 of the slider garnish 32 (FIG. 1A). The touch surface 196 is the lowest surface on the button member 194 and extends through the rectangular aperture 181 of the slider garnish shoulder 166 so as to be readily accessible to the user.

Referring to FIG. 1A, an additional garnish section 212 is fitted around the D-ring 36. The vehicle B-pillar 28 is of a type known to those in the art. A notched rail 50 is affixed to the B-pillar 28 on a side towards the interior of the vehicle 30 using two bolts. A fiber washer 214 is placed between the B-pillar 28 and the rail 50. The rail 50 includes notches 50a oriented vertically along the rail 50 that receive the pin 26 from the button assembly 24.

Referring to FIGS. 2 and 5, the pillar garnish 122 is attached to other garnish members within the vehicle interior. The garnishes are assembled such that the slider garnish 32 is slidingly supported by the pillar garnish 122 under clips 138a, 138b on the side of the pillar garnish 122 closest to the B-pillar 28. The raised portion 164 of the slider garnish 32 extends through the hole 132 defined by the pillar garnish 122. The slider garnish 32 is oriented and dimensioned such that as it is moved with respect to the pillar garnish 122, it continues to cover the hole 132 defined by the pillar garnish 122. The D-ring 36 is aligned with and may at least partially extend through the generally arcuate aperture 172 defined by the slider garnish 32. The button member 194 of the button garnish 34 extends through the hole 181 defined in the shoulder 166 of the slider garnish 32 such that the touch surface 196 is exposed.

Referring to FIG. 1A, the base 52 is affixed to the button holder 58 which, in turn, is affixed to the slider garnish 32 via the interaction of the curved projection 104 and hollow post 170. The button assembly 24 is affixed to the rail 50 via the slider 54 and the rail 50 is in turn affixed to the vehicle's B-pillar 28. The D-ring support assembly 22 affixes to the button assembly 24.

Referring to FIGS. 1A and 3, the D-ring 36 supports the web 44 of the vehicle seat belt. The web 44 loops through the slot 42 within the D-ring 36 and the D-ring 36 rotates upon the support bearing 38 as the vehicle occupant adjusts the seat belt from an idle position into a use position.

The pin 26 within the button assembly 24 functions to selectively lock the anchor 20 into place. The pin 26 moves between locking and unlocking positions in a direction generally perpendicular to the plane of the B-pillar 28 and generally perpendicular to the axis defined by the length of the vehicle 30. The flange 68 upon the head section 66 of the pin 26 limits movement of the pin 26 toward the B-pillar 28 and also provides a seat for the pin return spring 74. The annular groove 72 formed in the tail section 70 of the pin 26 receives and supports the push nut 64 that translates or transfers vertical movement of the pitched body 62 into lateral movement of the pin 26.

The base of the button assembly 24 supports the button assembly 24 within the vehicle 30. The nut 78 upon the base 52 is attachable to the bolt 40 within the D-ring support assembly 22. The slider 54 provides multiple points of contact with the rail 50 via its four fingers 84. The aperture 88 adjacent the lower end of the slider 54 allows passage of the integral nut 78 in the base 52 and the aperture 86 adjacent the upper end of the slider 54 allows passage of the pin 26. The generally central aperture 90 allows passage of the rivet 118 that holds the button assembly 24 together. The plate 56 provides a stationary barrier between the movable slider 54 and the button holder 58. The button holder 58 supports both the button 60 and a button return spring 116. The button 60 functions as an interface between the button garnish 34 and the movable anchor 20. The pitched button body 62, in conjunction with the push nut 64 displaces the pin 26 upon actuation of the button 60.

Referring to FIGS. 2 and 5, the slider garnish 32 functions as a protector for the button assembly 24 as well as a support for the button garnish 34 and a decorative cover. As the anchor 20 is moved, the moving slider garnish 32, that is sized larger than the hole 132 defined by the pillar garnish 122, continues to cover the hole 132 defined by the pillar garnish 122. The slider garnish 32 also functions as a support for a garnish spring 216 that biases the slider garnish 32 away from the button garnish 34. The button garnish touch surface 196 is the portion that the occupant's hand contacts. The button garnish 34 transfers motion from the operator to the button 60, over the resistance from the garnish spring 216 to the button 60, via the lever 190. Reinforcing ribs 136 in the pillar garnish 122 provide strength and rigidity. The pillar garnish brackets 160 allow the pillar garnish 122 to be mounted to an adjacent garnish section.

Referring to FIGS. 1A and 1B as well as 4A and 4B, as the pin 26 is moved away from the B-pillar 28 and out of notches 50a within the rail 50, the anchor 20 may be slid into a new position. The pin 26 then may be returned into a locking position. As the anchor 20 is moved, the fingers 84 of the slider 54 move along the notched rail 50 affixed to the B-pillar 28. Frictional resistance is minimized because only the reduced area of the slider fingers 84 contacts the rails 50.

The button garnish 34 is pushed upwardly toward the shoulder 166 of the slider garnish 32 to actuate movement of the pin 26. Upon pushing, the button garnish 34 moves against the resistance of the button return spring 116 and garnish spring 216. The lever 190 is forced into contact with the button 60, moving the pitched button body 62 and causing the push nut 64 to ride or cammingly move up the walls of the pitched button body 62. As a result of the movement of the push nut 64, the pin 26 is pulled or moved away from the B-pillar 28 against the biasing force of the pin return spring 74.

As the anchor 20 is moved, the slider garnish 32 and the button garnish 34 it supports also move relative to the pillar garnish 122. As the desired position is reached, the button garnish 34 is released, the pin 26 snaps into one of the rail notches 50a, and the pin 26, button 60 and button garnish 34 return to the un-actuated position.

Although the invention has been described with a perpendicular pin type button assembly, any type of button assembly that may be actuated by means of upward motion of the lever may be used. Additionally, variations of the ornamental aspects of any of the garnish members may be substituted. Moreover, although the present invention has been described hereinbefore as being used in conjunction or in association with a vehicle B-pillar, it is considered apparent that the present invention is not so limited, but may be used in many locations within a vehicle, including rear seats wherein the seat belt structure is associated with the C-pillar or with no pillar.

The present invention provides an ergonomic actuator that is aesthetically pleasing. A button upon the actuator is moved upward by a pushing motion. The actuator blends in well with other parts of a vehicle's interior and is simple to manufacture.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. An actuator system allowing adjustment of a seat belt D-ring anchor movable with respect to a generally vertical vehicle pillar, said actuator system comprising:
    a slider garnish; and
    a button garnish including a touch surface and an actuating lever, wherein a portion of said slider garnish is disposed between the touch surface and the lever, said button garnish slidingly supported by said slider garnish, allowing upward vertical displacement upon operator contact with said touch surface, whereby said lever is also moved upwards to displace from the vehicle pillar a locking pin oriented generally perpendicular to a plane defined by the vehicle pillar, allowing vertical adjustment of the seat belt D-ring anchor.

2. The actuator system of claim 1, wherein the slider garnish defines an aperture through which a seat belt D-ring support protrudes.

3. The actuator system of claim 1, wherein said actuating lever is integrally formed with said button garnish.

4. The actuator system of claim 1, wherein said lever includes a base wall with two vertical side walls that extend from the base wall in a tapering fashion from the button garnish toward the vehicle pillar.

5. The actuator system of claim 4, wherein said vertical side walls are spaced apart from each other.

6. The actuator system of claim 1, further including a device for biasing said button garnish downwards with respect to said slider garnish when in a non-actuated state.

7. The actuator system of claim 1, wherein said slider garnish is slidingly supported by a pillar garnish.

8. The actuator system of claim 1, wherein said slider garnish comprises a shoulder projecting away from the vehicle pillar and said shoulder defines an aperture through which said button garnish protrudes.

9. The actuator system of claim 1, further including a pillar garnish covering a portion of the vehicle pillar, the pillar garnish also covering a portion of a seat belt web extending from a spool to a D-ring upon the D-ring anchor.

10. The actuator system of claim 9, wherein said pillar garnish defines an aperture through which a portion of said slider garnish and said button garnish project.

11. The actuator system of claim 1, wherein said touch surface of said button garnish is part of a step spaced apart from a frame-shaped section of said button garnish.

12. The actuator system of claim 1, wherein said lever is generally wedge shaped.

* * * * *

UNITED STATES PATENT AND TRADEMARK OFFICE
CERTIFICATE OF CORRECTION

PATENT NO.        : 7,198,300 B2
APPLICATION NO.   : 10/836300
DATED             : April 3, 2007
INVENTOR(S)       : Daume et al.

Page 1 of 1

It is certified that error appears in the above-identified patent and that said Letters Patent is hereby corrected as shown below:

On the Title Page, Section [75], Inventors, Lines 4 and 5, delete "Kenji Betsui, Raymond, OH (US)".

Signed and Sealed this

Fifth Day of February, 2008

JON W. DUDAS
*Director of the United States Patent and Trademark Office*